(12) United States Patent
Druga

(10) Patent No.: US 6,875,343 B2
(45) Date of Patent: Apr. 5, 2005

(54) DUAL DIRECTION BYPASS VALVE

(75) Inventor: Larry A. Druga, Blythewood, SC (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/933,169

(22) Filed: Aug. 21, 2001

(65) Prior Publication Data

US 2003/0010725 A1 Jan. 16, 2003

Related U.S. Application Data

(60) Provisional application No. 60/303,792, filed on Jul. 10, 2001.

(51) Int. Cl.[7] .......................... B01D 27/10; B01D 35/15
(52) U.S. Cl. ...................... 210/130; 210/223; 210/429; 210/446; 137/493.6; 137/493.9
(58) Field of Search .............................. 137/493.9, 493, 137/493.7, 512–513, 493.6, 506; 210/130, 133, 136, 429, 222, 223, 446; 55/313

(56) References Cited

U.S. PATENT DOCUMENTS

| | | | | |
|---|---|---|---|---|
| 3,456,800 A | * | 7/1969 | Humbert, Jr. | ............... 210/130 |
| 3,799,347 A | * | 3/1974 | McDuffie | |
| 3,996,137 A | * | 12/1976 | Cooper | ....................... 210/130 |
| 4,318,809 A | * | 3/1982 | Bethel | |
| 6,139,737 A | | 10/2000 | Gizowski | ..................... 210/223 |

* cited by examiner

Primary Examiner—Terry K. Cecil
(74) Attorney, Agent, or Firm—Baker & Hostetler LLP

(57) ABSTRACT

A dual direction bypass valve allows a transmission filter to function whether or not it is placed in the vehicle transmission correctly. The filter includes a front and rear valve bodies separated by an end cap, and each having a spring and disk. When the filter media is clogged during normal forward flow, the fluid pressure on the rear valve body disk compresses the spring, opening an aperture in the end cap, allowing the fluid to pass from the front valve body through the rear valve body to the outlet, bypassing the filter media. If the transmission filter is placed in the engine backwards, the fluid pressure compresses the spring of the front valve body and opens up apertures in the end cap, such that the fluid flows through the apertures and the front valve body, bypassing the rear valve body and the filter media, to exit the filter.

16 Claims, 8 Drawing Sheets

FIG. 8

DUAL DIRECTION BYPASS VALVE

This application claims the benefit of U.S. Provisional Application No.: 60/303,792, filed Jul. 10, 2001, the disclosure of which is hereby incorporated by reference in its entirety.

FIELD OF THE INVENTION

The present invention relates to the field of bypass valves for fluid filters. In particular, the present invention is related to a bypass valve for a transmission filter for a vehicle with automatic transmission, which allows transmission fluid to flow in opposite directions through the filter.

BACKGROUND OF THE INVENTION

Transmission fluid in vehicles with automatic transmissions, is circulated through a filter to remove particles that may damage mechanical components of the transmission. These particles may include metal particles that can be particularly damaging to the transmission components.

A prior art transmission fluid filter 10, such as the transmission filter disclosed in U.S. Pat. No. 6,139,737 (Gizowski), includes such a conventional bypass valve 11 in housing 23 (see FIG. 1). The bypass valve 11 includes a tubular valve body 12 attached to, and axially extending from the distal end of post 13. The valve 11 further includes a plunger 14 which is slidably received in the valve body 12, and plunger spring 15 is received in valve body 12 between post 13 and plunger 14. Retainer 16 (which is integrally molded with the upper body 17), is positioned between bypass valve 11 and inlet end wall 18, and retainer spring 19 attaches retainer 16 to end wall 18. If filter media 20 becomes plugged during use of filter 10, the differential pressure between inlet 21 and outlet 22 overcomes the bias of the plunger spring 15, shifting plunger 14 toward post 13. This allows fluid to pass through valve body 12 into post 13, thereby bypassing filter media 20. Thus, although the fluid is not filtered, it does not clog the filter 20 and result in overheating of the transmission.

However, Gizowski and other conventional transmission filters suffer from the disadvantage that, since the inlet end 21 and outlet end 22 are similar in appearance, if the filter 10 is placed in the transmission of the vehicle backwards (i.e., fluid entering through outlet 22 and exiting through inlet 21), then a clog occurs, which restricts the flow of transmission fluid through the filter 10 resulting in the vehicle transmission overheating and causing damage to the vehicle transmission.

SUMMARY OF THE INVENTION

Accordingly, an object of the present invention is to provide a dual direction bypass valve which allows the transmission filter to function whether or not it is placed in the vehicle transmission correctly. In other words, even if the transmission filter is installed backwards, the transmission filter will still function, fluid will still go through the filter, and damage will not be caused to the vehicle transmission.

The dual direction bypass valve for the transmission filter includes a valve body having a front and a rear separated by a metal end cap. The front valve body includes a first metal spring seated over an aperture and against a round, preferably plastic, first disk. The first spring and first disk are retained in a preferably metal, first spring and disk retainer. Two substantially semi-circular holes are disposed in the retainer on opposite sides from one another, and allow fluid to pass through the holes. The front valve body allows fluid flow from the inlet, through an aperture in the first spring and disk retainer into the first spring and disk retainer, and out through the retainer holes, towards the sides of the canister housing, and through spaces between the central wall and the filter media. The fluid is then filtered by the filter media, before collecting in a central passage in the filter, and exiting through the outlet.

The filter rear valve body includes a preferably metal, second spring and disk retainer, which retains a second metal spring and a second, round, phenolic (plastic) disk. An aperture and two semi-circular holes in the second retainer, allow fluid to pass through into the second retainer when the dual direction bypass valve is disposed backwards in the transmission. The semi-circular holes are disposed opposite to one another. Two circular holes in the end cap which is disposed between the first disk and the second disk, allow fluid to pass through the metal end cap from the central passage through the first retainer, when the dual direction bypass valve is disposed backwards in the transmission.

During normal forward flow, the fluid enters through the inlet, the first retainer, around the sides of the canister, through the filter media to the central passage, and out through the outlet of the filter.

However, in normal forward flow bypass mode, when the filter media is clogged, the pressure of the fluid builds up against the second disk, and the fluid pressure forces the second disk to compress the second spring, allowing fluid to pass from the first retainer through the apertures in the first disk and the end cap, to the second retainer and through the filter central passage to the outlet.

When the dual direction transmission filter assembly is mistakenly inserted backwards in the vehicle transmission, in backwards or reverse flow, the fluid enters through the outlet and passes through the filter central passage, through the filter media, and out through the first retainer and the inlet.

However, in backward or reverse flow bypass mode, if the filter media becomes clogged, the pressure of the fluid builds up against the first disk, forcing the first disk to compress the first spring, and allowing the fluid to pass through holes in the end cap of the filter and through the first retainer and out through the filter inlet.

Thus, the transmission is never damaged due to clogging of the filter, even if the filter is inserted backwards in the transmission.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Additional features, details, and advantages of the invention, will become evident from the following description and the drawing, wherein.

DETAILED DESCRIPTION OF THE PREFERRED EMBODIMENTS

Figure 1:
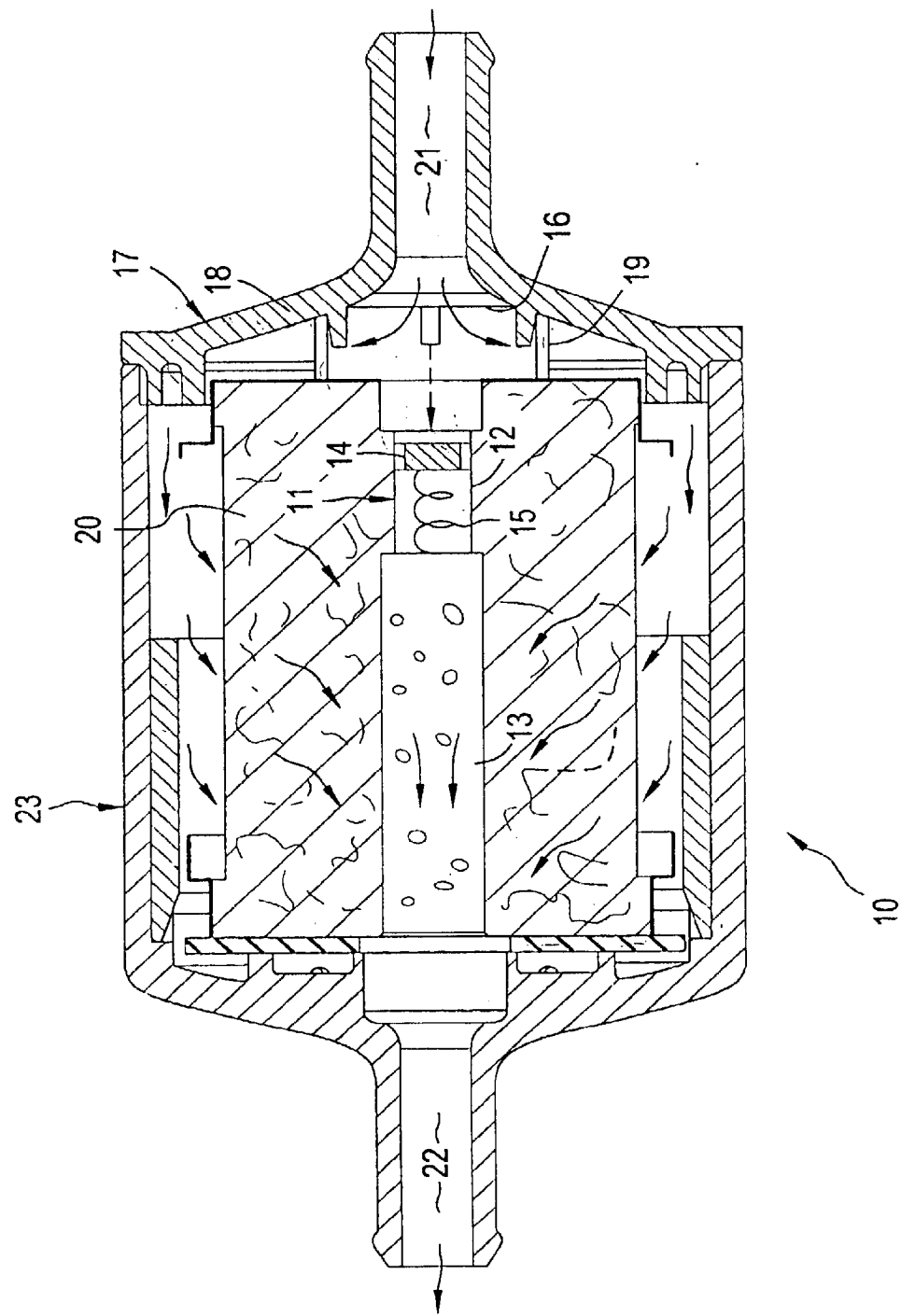
FIG. 1 is a sectional view of a conventional filter.
Figure 2:
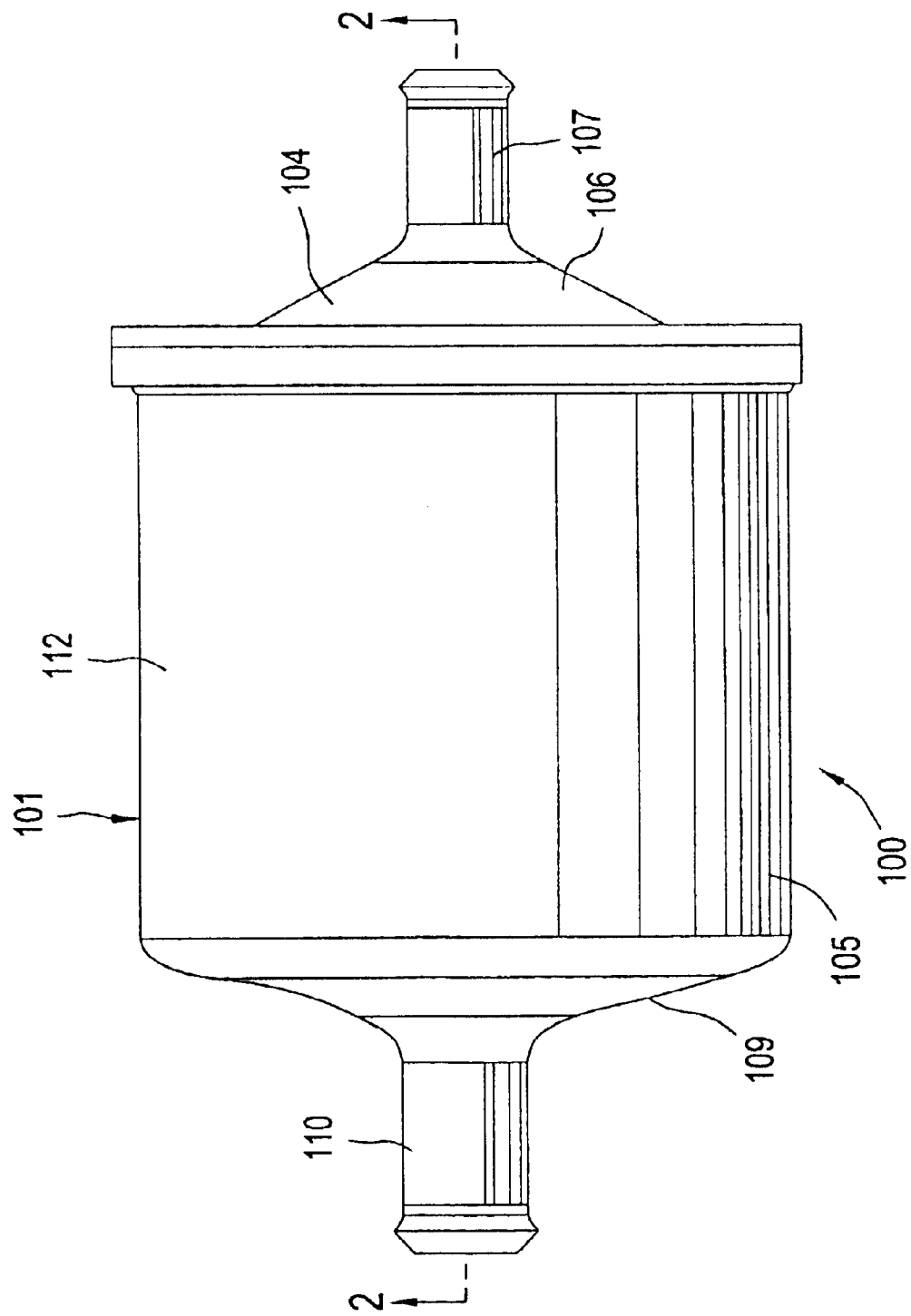
FIG. 2 is a side view of the dual direction bypass filter in accordance with one preferred embodiment of the present invention.

The transmission filter 100 of the present invention, is disclosed in the following description and shown in FIGS. 2–8. The transmission filter 100 (see FIG. 2), in accordance with a preferred embodiment of the present invention, includes a canister housing 101, filter media 102, and dual direction bypass valve 103.

The canister housing 101 (see FIG. 2) is composed of a metal or plastic material which is sturdy and able to withstand high temperatures. The canister housing 101 includes an upper body 104 and a lower body 105 which are joined by an ultrasonic weld. The upper body 104 integrally includes inlet end wall 106 with tubular hose barb 107 extending therefrom defining transmission fluid inlet 108 (see FIG. 3). The hose barb 107 is inserted onto a transmission hose (not shown) and clamped.

Figure 3:
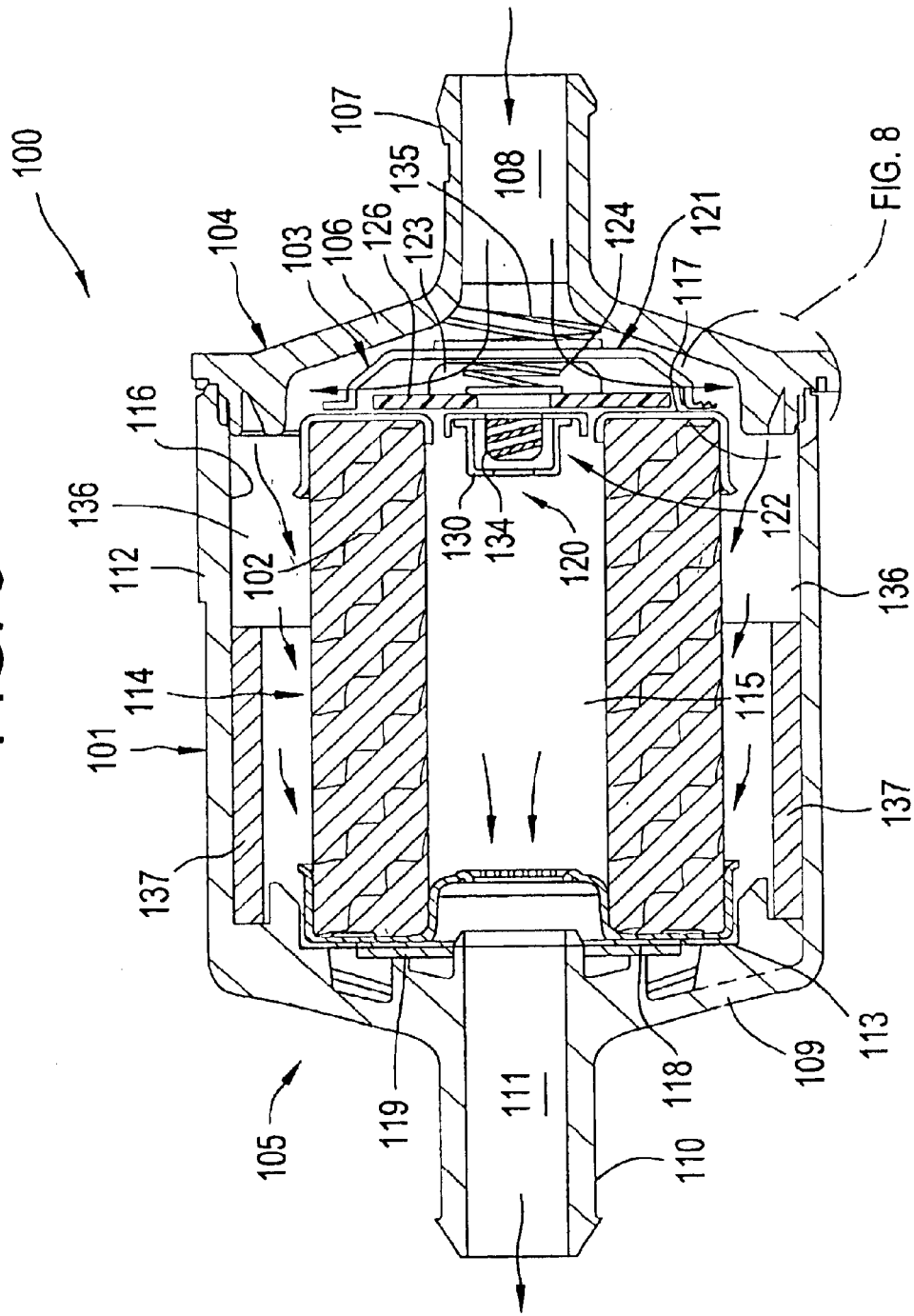
FIG. 3 is a sectional view of the dual direction bypass filter taken along line 2—2 of FIG. 2, particularly showing the normal forward flow of the fluid through the filter.
Figure 4:
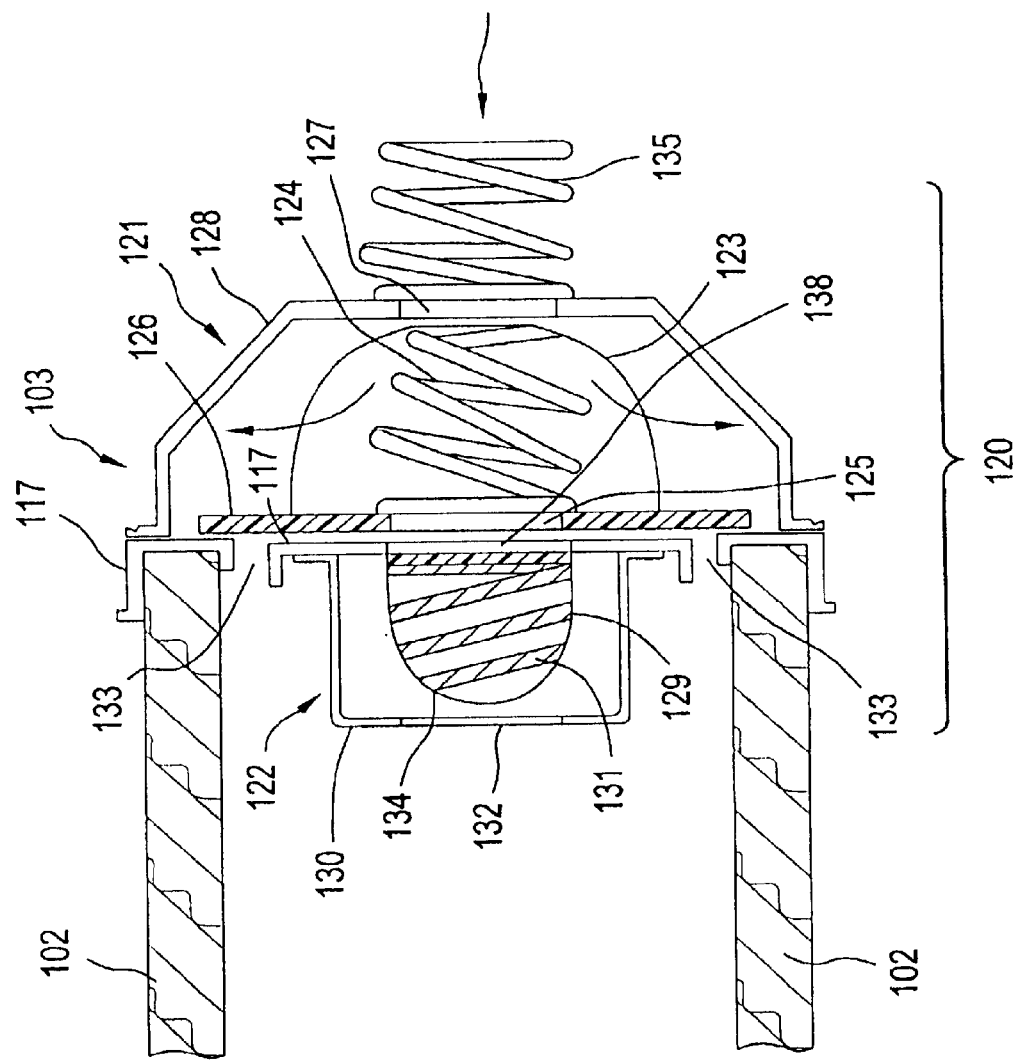
FIG. 4 is a detailed enlarged sectional view of the dual direction bypass filter of FIG. 3, particularly showing the normal forward flow of the fluid through the filter.
Figure 5:
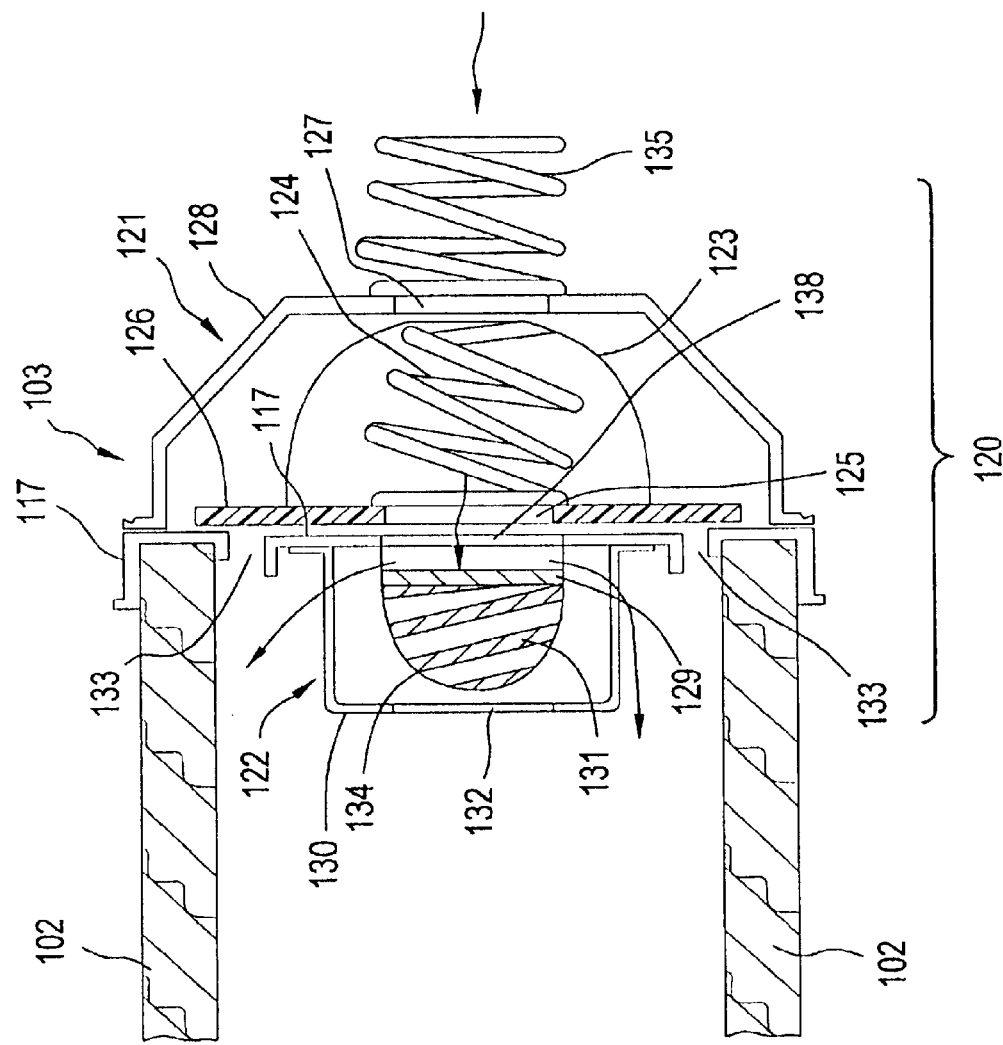
FIG. 5 is a detailed enlarged section view of the dual direction bypass filter of FIG. 3, particularly showing the second disk compressing the second spring to allow fluid to bypass a clogged filter media during normal forward flow bypass mode.
Figure 6:
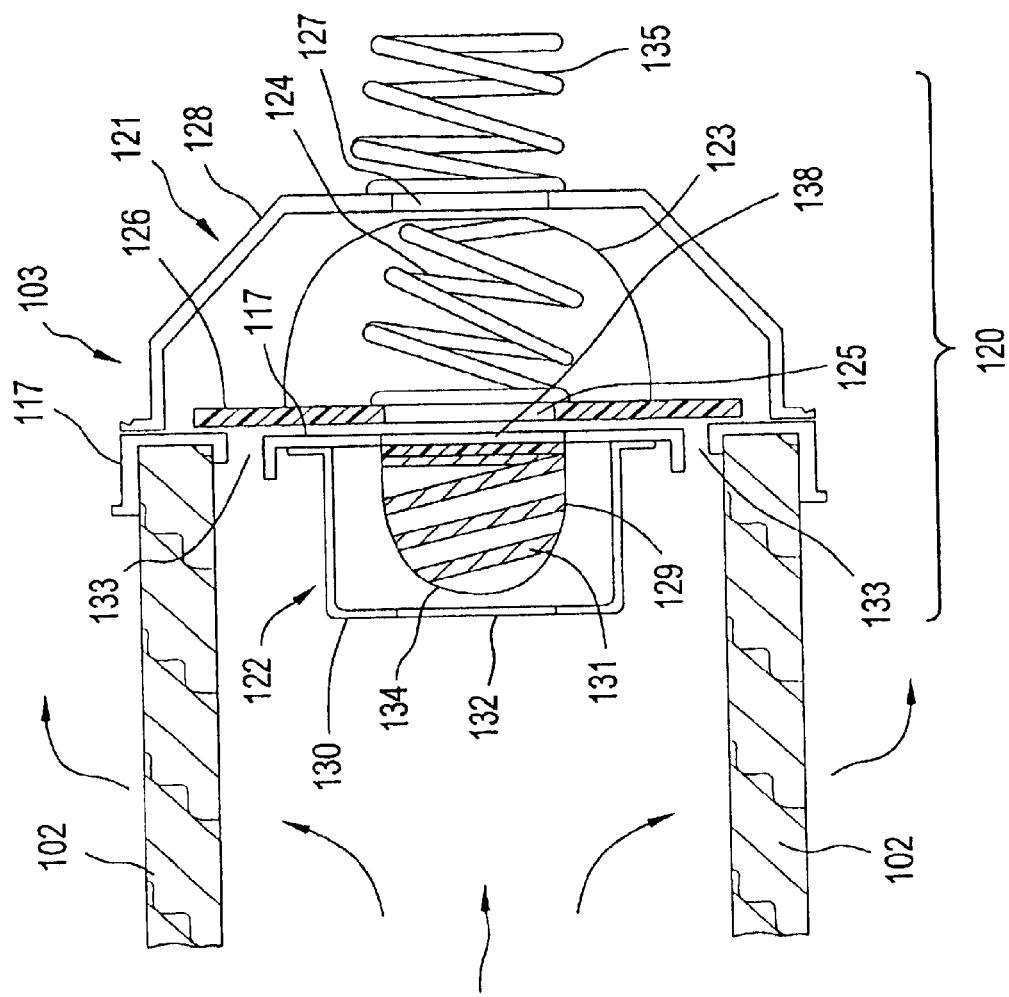
FIG. 6 is a detailed enlarged sectional view of the dual direction bypass filter of FIG. 3, particularly showing the backward or reverse flow of the fluid through the filter.
Figure 7:
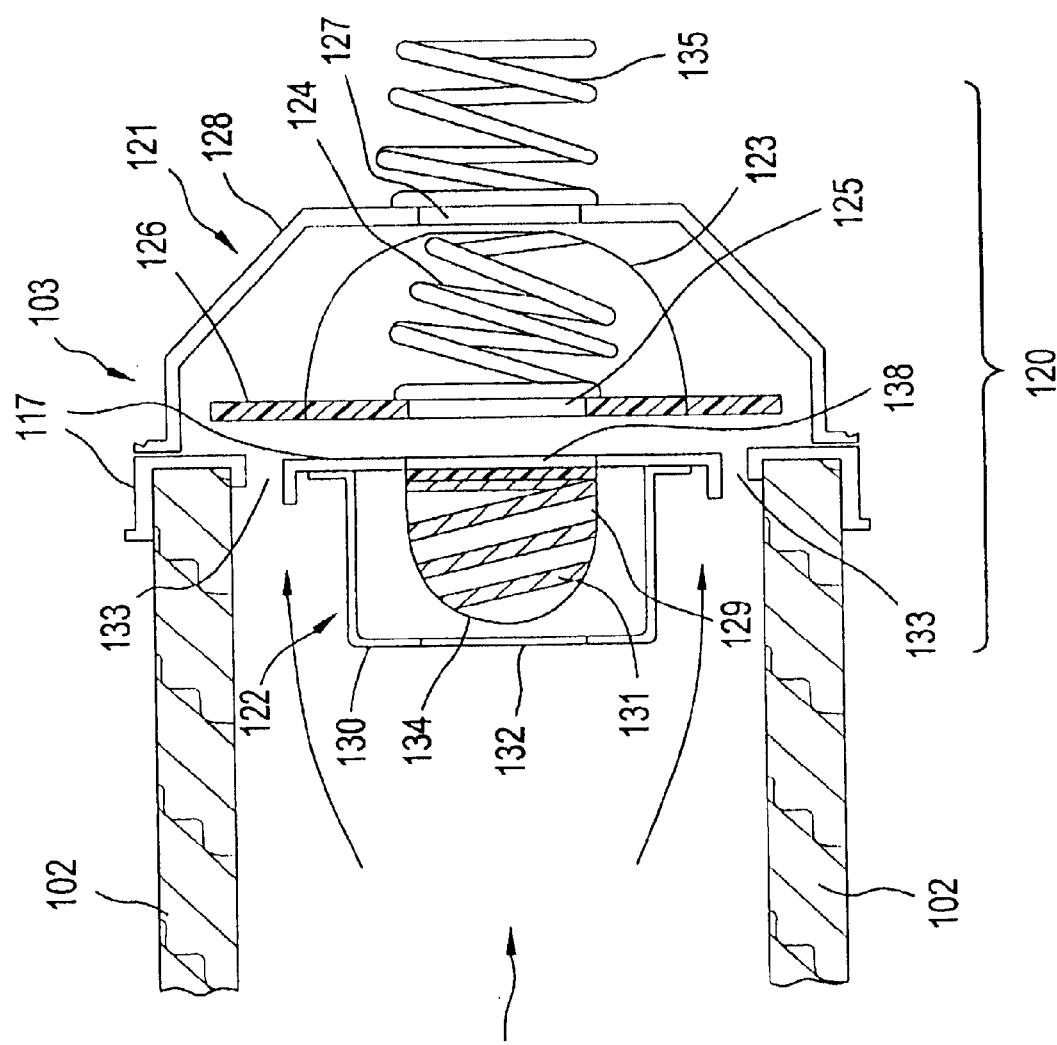
FIG. 7 is a detailed enlarged sectional view of the dual direction bypass filter according to FIG. 3, particularly showing the first disk compressing the first spring to allow fluid to bypass a clogged filter media during backward or reverse flow bypass mode.
Figure 8:
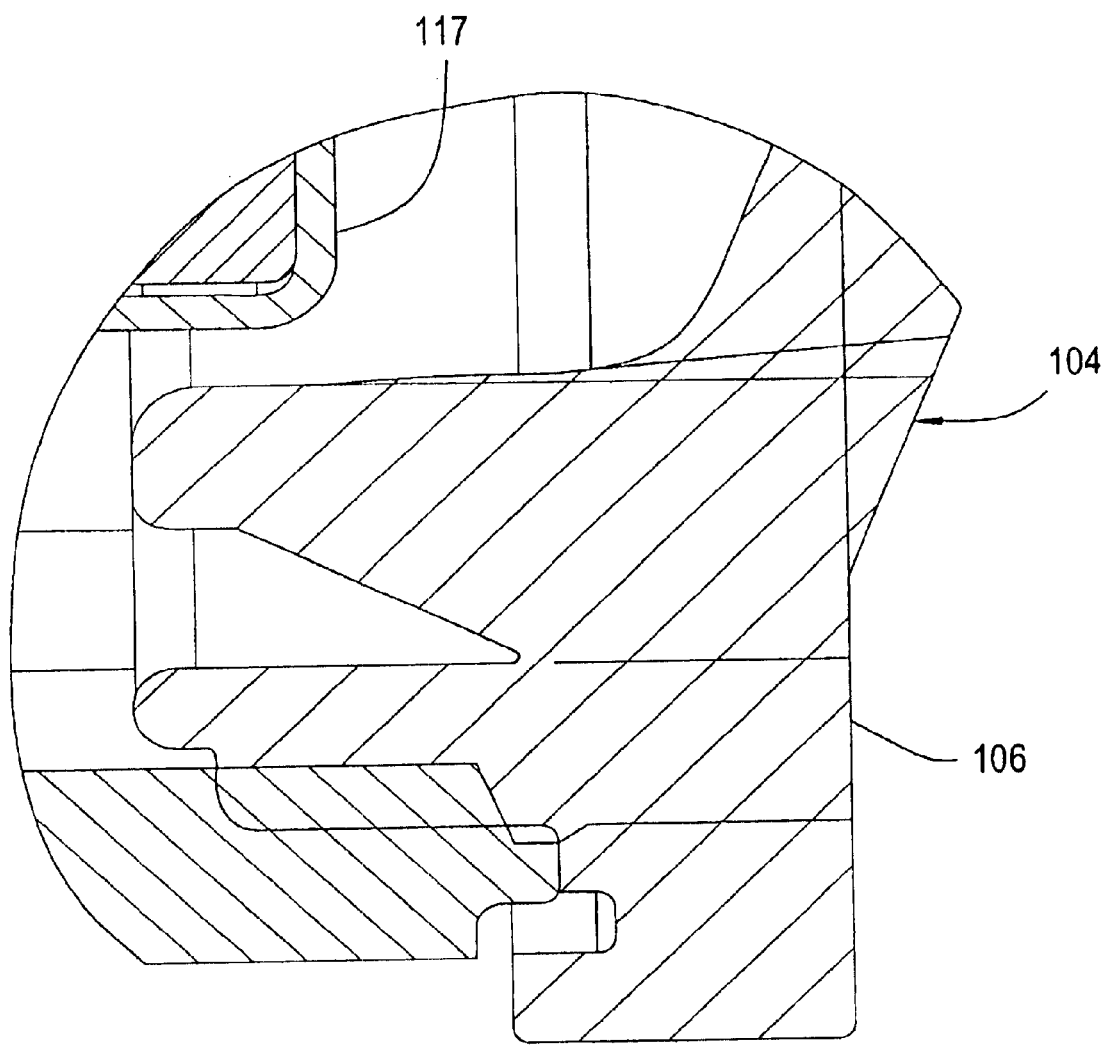
FIG. 8 is an enlarged view of the encircled area shown in FIG. 3, showing further detail of the dual direction bypass filter.

The lower body 105 of the canister housing 101 includes outlet end wall 109 which is formed as an end cap, with another tubular hose barb 110 extending therefrom defining transmission fluid outlet 111 (see FIG. 3). The lower body 105 also includes a tubular central wall 112 extending from outlet end wall 109 adjacent hose barb 110 to the inlet end wall 106. An ultrasonic weld 113 joins the end cap 118 of outlet end wall 109 to central wall 112 as illustrated. Chamber 114 is formed within canister housing 101 between inlet 108 and outlet 111.

Filter media 102, which is made of a paper-based material or the like, is received in chamber 104 in the fluid flow path (see arrows showing fluid flow direction in FIG. 3) between inlet 108 and outlet 111. Filter media 102 surrounds a central passage 115 which extends from the inlet 108 to the outlet 111, and is spaced from the interior face 116 of the central wall 112.

Inlet media end cap 117 and outlet media element end cap 118 retain the filter media 102 in the position shown in FIG. 3. The inlet media end cap 117 and outlet media end cap 118 are preferably made of metal. Seal 119, which is preferably composed of polyacrylate rubber, is positioned between outlet end cap 118 and outlet end wall 109 to provide a seal therebetween.

The dual direction bypass valve 103 includes a valve body 120 having a front valve body 121 and a rear valve body 122 (see FIGS. 3–7). Inlet media end cap 117, which has a central hole 138 therein, separates the front valve body 121 and rear valve body 122.

Front valve body 121 (see FIG. 4) includes a first metal spring 124 seated over an aperture 125 in a round, preferably plastic, first disk 126, the first spring 124 and first disk 126 both being retained in a preferably metal, first spring and disk retainer 128. The first disk 126 is seated against end cap 117. (Note: Although the first disk 126 is seated against end cap 117, the Figures show some spacing for better clarity). Two substantially semi-circular holes 123 are disposed in the retainer 128 on opposite sides from one another, and allow fluid to pass through the holes 123. The front valve body 121 allows fluid flow through aperture 127 into the first retainer 128, and through the holes 123, outwards, towards the sides of the canister housing 101 (see arrows showing direction of fluid flow in FIG. 3) and spaces 136 between the central wall 112 and the filter media 102.

Rear valve body 122 (see FIG. 4) includes a preferably metal, second spring and disk retainer 130, which retains a second metal spring 131 and a second, round, phenolic (plastic) disk 129. Second disk 129 is seated against end cap 117, sealing the hole 138 in end cap 117. An aperture 132, and two semi-circular holes 134 in the second retainer 130, allow fluid to pass through into the second retainer 130 when the dual direction bypass valve 103 is disposed backwards in the transmission. The semi-circular holes 134 are disposed opposite to one another. Two circular holes in end cap 117 allow fluid to pass through the metal end cap 117 from the central passage 115 through the first retainer 128, when the dual direction bypass valve is disposed backwards in the transmission.

A stabilizing metal spring 135 is disposed on first retainer 128, over aperture 127, to keep the valve body 120 seated firmly within the canister 101 at the inlet end wall 106.

In operation, with the filter 100 correctly installed in the engine transmission, normal forward flow (see FIGS. 3–4) allows transmission fluid to enter through inlet 108 and pass through spring 135 and through aperture 127 into first retainer 128.

Circular shaped, flat phenolic second disk 129 is sealed against end cap 117, preventing fluid from flowing through aperture 125 in the first disk 126. First disk 126 is also sealed against end cap 117, covering holes 133 and preventing any fluid from flowing therethrough. Accordingly, the fluid entering into the first retainer 128 then passes through apertures 123 and into space 136 between the interior face 116 of the central wall 112 and the filter media 102.

An optional magnet 137 is positioned around the side wall of the interior face 116 of the filter 100, and attracts and retains magnetically susceptible particles in the transmission fluid. The magnetic body 134 is preferably composed of synthetic resin material having magnetic particles dispersed therein, as described in U.S. Pat. No. 6,139,737 (Gizowski), which is herein incorporated by reference.

Once in the space 136, the transmission fluid then passes through the filter media 102 where particles are removed and the fluid filtered. The filtered fluid then collects in central passage 115 and the passage 115 directs the fluid to the outlet 111 of hose barb 110, where it exits the filter 100.

In normal forward flow bypass mode (see FIG. 5), if filter media 102 becomes plugged during use of filter 100, and the fluid can not pass through the filter media 102, the differential pressure between inlet 108 and outlet 111 overcomes the bias of second spring 131, moving disk 129 of rear valve body 122 away from end cap 117, toward aperture 132 and compressing second spring 131. This movement of second disk 129 allows fluid to pass from front valve body 121 via apertures 125 and 138, through rear valve body 122 and apertures 132 and 134, and into central passage 115, thereby essentially bypassing filter media 102 (see FIG. 5, which shows second disk 129 compressing second spring 131). The fluid then exits through outlet 111 in hose barb 110.

Thus, although the transmission fluid is unfiltered, the filter 100 will not become clogged and back up in the filter 100, causing the transmission of the vehicle engine to be damaged before it is removed by the vehicle user.

However, since the appearance of the inlet tubular hose barb 107 and the outlet tubular hose barb 110 of the filter 100 are similar, confusion can occur and the filter 100 can be placed in the transmission housing backwards by the vehicle user. In this case, the transmission fluid enters through "outlet" 111, and passes through central passage 115 to reach "inlet" 108 and exit therethrough.

Thus, in backward or reverse flow (see FIG. 6), the fluid enters in through outlet 111 and passes through central passage 115 to be filtered through the filter media 102. The filtered fluid exiting from the filter media 102 enters into the space 136, and flows through apertures 123 and 127, and out through inlet 108 of hose barb 107.

However, if the fluid entering through outlet 111 is clogged with particles, or if filter media 102 is clogged with particles, the above backward or reverse flow is difficult to achieve. In conventional filters, this would result in a backup within the filter 100, which would cause clogging and damage to the vehicle engine transmission.

However, in the present invention, this clogging during backward or reverse flow is prevented by the following important structure of the dual direction bypass valve 103.

In backward or reverse flow bypass mode (see FIG. 7), when the fluid enters the central passage 115 from outlet 111, and the filter media 102 is clogged, or the fluid is clogged with particles, and the fluid is unable to be transmitted through the filter media 102, the differential pressure around the rear valve body 122 builds up, and overcomes the bias of first spring 127, moving plunger disk 126 of front valve body 121 to compress first spring 124. Thus, first disk 126 moves away from end cap 117, which allows fluid to pass through apertures 133 into first retainer 128. The fluid then passes through apertures 123 and 127 toward inlet 108, exiting the filter 100. However, second disk 129 remains sealed against end cap 117 and does not allow fluid to pass through aperture 138 in end cap 117.

Accordingly, the backward or reverse bypass mode allows the unfiltered fluid to pass from central passage 115, through front valve body 121 and through apertures 133, 123, and 127, towards hose barb 107 and "outlet" 108, essentially bypassing filter media 102.

Thus, again, although filtering of the transmission fluid will not be achieved in backward or reverse bypass mode, clogging of the filter 100 will not occur, and the transmission fluid will pass through the filter 100, preventing the transmission from overheating and damaging the vehicle engine.

Those skilled in the art will recognize that there are other variations in the preferred embodiment of the present invention, and that other suitable materials can be used for the various structural elements of the invention. Further, other attachment techniques, other than ultrasonic welding, can be practiced with this invention. Further, the filter can be used for other fluids, such as oil.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fluid filter having two opposed ends comprising:
    a housing having;
        an inlet end having an inlet for passage of fluid into said filter; and
        an outlet end having an outlet for passage of fluid leaving said filter;
    a filter media assembly disposed between said inlet and said outlet, for filtering said fluid, the filter media assembly being substantially coaxial with the inlet and outlet and said filter media assembly abutting said outlet end;
    a valve body located proximate said inlet end comprising:
        a first retainer which houses a first spring, the first retainer engaging the first spring at one end of the first spring and a first disk disposed at another end of said first spring; and
        a second retainer located in the same inlet end as the first retainer and coaxial with said first retainer, disposed opposite to said first retainer, said second retainer having a second spring, the second retainer engaging the second spring at one end of the second spring, and a second disk disposed at another end of said second spring; and
    a stabilizing spring coaxial with said body and each located at said inlet end between and in contact with said first retainer and said inlet end, said spring urging said filter media assembly against said outlet to stabilize said filter media assembly and said valve body;
    wherein said second disk is operative to compress said second spring in a first direction toward said second retainer;
    wherein said first disk is operative to compress said first spring in a second direction toward said first retainer, said first direction being opposite to said second direction;
    wherein the fluid filter will function if installed so that the inlet functions as an outlet and the outlet serves as an inlet,
    wherein said inlet end said outlet end and said filter media assembly are substantially coaxial.

2. A fluid filter having two opposed ends comprising:
- a housing defining a chamber, said chamber having an inlet at an inlet end through which fluid enters said fluid, and an outlet at an outlet end through which said fluid leaves said filter;
- a filter media assembly disposed in said chamber between said inlet and said outlet and abutting said outlet end, for filtering said fluid, said filter configured to filter fluid in either a forward flow direction or a reverse flow direction;
- means for allowing a fluid to flow from said inlet to said outlet in a first fluid flow path, through said filter media;
- valve means located proximate said inlet end and configured to control flow,
- said valve means comprising (i) a forward flow bypass means for allowing said fluid to flow from said inlet to said outlet in a second fluid flow path, bypassing said filter media; and (ii) a reverse flow bypass means disposed adjacent said forward flow bypass means and in the same end of the filter as the forward flow bypass means, and coaxial with said forward flow bypass means for allowing said fluid to flow in a third fluid flow path, bypassing said filter media, and
- stabilizing and biasing means coaxial with said valve means and located at said inlet end and between and in contact with said forward flow bypass means and said inlet to urge said filter media assembly against said outlet end and to stabilize said filter media assembly and valve means,
- wherein the filter media, the inlet, and the outlet are substantially coaxial.

3. The fluid filter according to claim 2, wherein said first fluid flow path includes said inlet a space between an interior face of a central wall of said chamber and said filter media, said filter media, a central passage within said chamber, and said outlet.

4. The fluid filter according to claim 2, wherein said means for allowing said fluid to flow in said first fluid flow path comprises:
- a plurality of apertures in a first retainer housing a first spring and a first disk, leading to a space disposed between an interior face of a central wall of said chamber and said filter media; and
- a central passage within said chamber;
- wherein said fluid passes through said apertures of said first retainer housing, said space, said filter media, and said central passage in said first fluid flow path.

5. The fluid filter according to claim 2, wherein said reverse flow bypass means includes:
- a front valve body having a first retainer housing a first spring, the first retainer engaging the first spring at one end of the first spring, and a first disk disposed at another end of said first spring; and
- an end cap against which said first disk is seated, said end cap having holes in a periphery of said end cap which are sealed by said first disk;
- wherein said first disk is operative to compress said first spring, moving said first disk from said end cap and opening up said holes for said fluid to pass through said front valve body to said outlet, bypassing said filter media.

6. The fluid filter according to claim 5, wherein said forward flow bypass means includes:
- a rear valve body having a second retainer housing a second spring, the second retainer engaging the second spring at one end of the second spring, and a second disk disposed at another end of said second spring;
- wherein said end cap includes a central aperture, and said second disk is disposed against said end cap sealing said central aperture; and
- wherein said second disk is operative to compress said second spring, to allow said fluid to pass through said central aperture, through said rear valve body to said outlet, bypassing said filter media.

7. The fluid filter according to claim 2, wherein said second fluid flow path leads from said inlet through a front valve body and through a rear valve body toward said outlet, bypassing said filter media.

8. The filter according to claim 7, wherein said third fluid flow path leads from said outlet through said central passage, through said front valve body, to said inlet, bypassing said rear valve body and said filter media.

9. The filter according to claim 2, further comprising a magnet positioned around a side wall of an interior face of said chamber, which attracts and retains magnetically susceptible particles in said fluid.

10. A fluid filter having two opposed ends comprising:
- a housing defining a chamber, said chamber having an inlet at an inlet end and an outlet at an outlet end, through which fluid passes from said inlet to said outlet, the inlet and outlet configured to be substantially coaxial;
- a filter media disposed between said inlet and said outlet, which filters said fluid;
- a valve assembly located proximate said inlet end, having:
- a front valve body having a first retainer housing a first spring, the first retainer engaging the first spring at one end of the first spring, and a first disk disposed at another end of said first spring;
- an end cap against which said first disk is seated, said end cap having holes in a periphery of said end cap which are sealed by said first disk, and said end cap having a central aperture;
- a rear valve body located in the same inlet end as the front valve body and coaxial with said first valve body, having a second retainer housing a second spring, the second retainer engaging the second spring at one end of the second spring, and a second disk disposed at another end of said second spring, said second disk sealing said central aperture of said end cap; and
- a stabilizing spring coaxial with said valve assembly disposed proximate said inlet end between said first retainer and said housing within said inlet end of said chamber, to hold said front valve body stably within said chamber which urges said filter media assembly against said outlet end to stabilize said filter media preferably end valve body;
- wherein said first disk is operative to compress said first spring in a first direction, moving said first disk away from said end cap and opening up said holes in said periphery of said end cap, allowing fluid to pass through said holes and said front valve body to exit said filter, bypassing said filter media;
- wherein said second disk is operative to compress said second spring, to allow said fluid to pass through said central aperture of said end cap from said front valve body, through said rear valve body to exit said filter, bypassing said filter media, and
- wherein said inlet end, said outlet end and said filter media are substantially coaxial and the inlet and outlet have tubular hose barbs and the filter is configured to function if the filter is installed so that the inlet functions as an outlet and the outlet functions as an inlet.

11. The filter according to claim 10, wherein said end cap comprises a central aperture and a plurality of peripheral holes.

12. The filter according to claim 11, wherein said valve body is a rear valve body, and when said disk compresses said spring, said disk moves away from said end cap, unsealing said central aperture of said end cap for passage of said fluid therethrough.

13. The filter according to claim 11, wherein said valve body is a front valve body, and when said disk compresses said spring, said disk moves away from said end cap, unsealing said peripheral holes of said end cap for passage of said fluid therethrough.

14. The filter according to claim 10, wherein said disk is made of plastic.

15. The filter according to claim 10, wherein said retainer, said spring, and said end cap, are made of metal.

16. The fluid filter of claim 10, further comprising: an end cap separating said first disk from said second disk.

* * * * *